United States Patent [19]

Brown

[11] 4,226,478
[45] Oct. 7, 1980

[54] WIRE SPOKE WHEEL

[75] Inventor: Raymond C. Brown, Tarzana, Calif.

[73] Assignee: Superior Industries International, Inc., Van Nuys, Calif.

[21] Appl. No.: 931,755

[22] Filed: Aug. 7, 1978

[51] Int. Cl.² .............................................. B60B 7/00
[52] U.S. Cl. .............................. 301/37 SS; 301/69; 301/74; 301/104
[58] Field of Search ............... 301/37 R, 37 SS, 37 N, 301/68, 69, 70, 74, 75, 80, 104, 105, 54; 29/159.01, 159.03

[56] References Cited

U.S. PATENT DOCUMENTS

| 173,601 | 2/1876 | Douglas | 301/69 |
| 482,658 | 9/1892 | Taylor | 301/104 |
| 1,303,501 | 5/1919 | Rouanet | 301/54 |

FOREIGN PATENT DOCUMENTS

| 714587 | 9/1931 | France | 301/37 SS |
| 778269 | 3/1935 | France | 301/54 |

Primary Examiner—H. Grant Skaggs
Attorney, Agent, or Firm—Fulwider, Patton, Rieber, Lee & Utecht

[57] ABSTRACT

An automotive vehicle wheel having a solid wheel body, provided with replaceable rows of inner and outer spokes. The spokes are purely ornamental and are readily replaceable in the event of damage. Such replaceability is made possible by providing each spoke with a longitudinally moveable mounting member. The mounting member is rotated relative to its respective spoke so as to place such spokes in longitudinal compression to hold them in place on the wheel.

9 Claims, 11 Drawing Figures

U.S. Patent Oct. 7, 1980 Sheet 3 of 4 4,226,478
FIG. 7
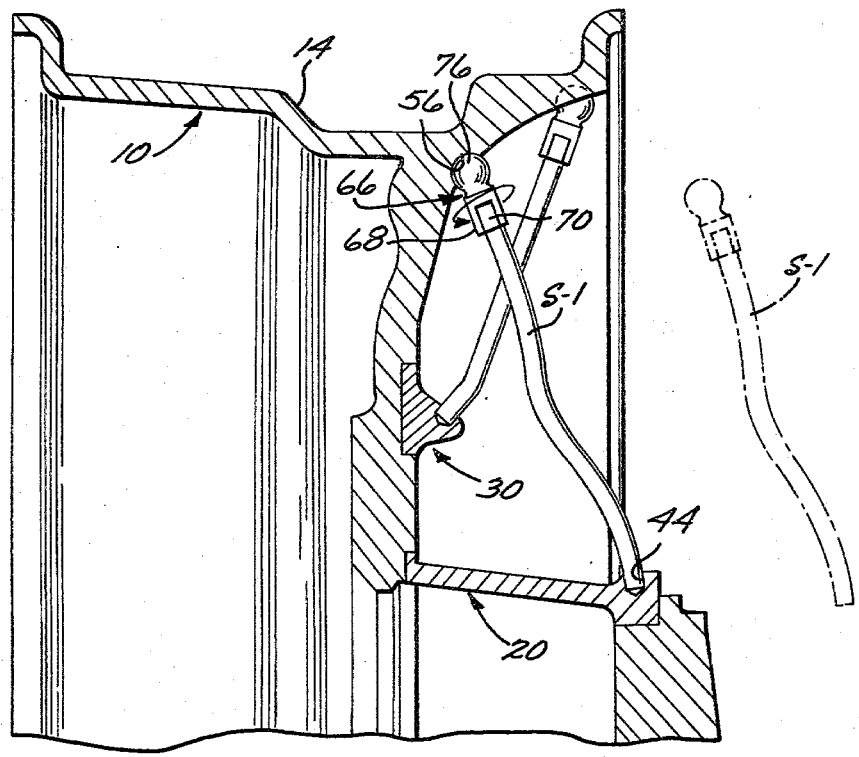
FIG. 8
FIG. 6
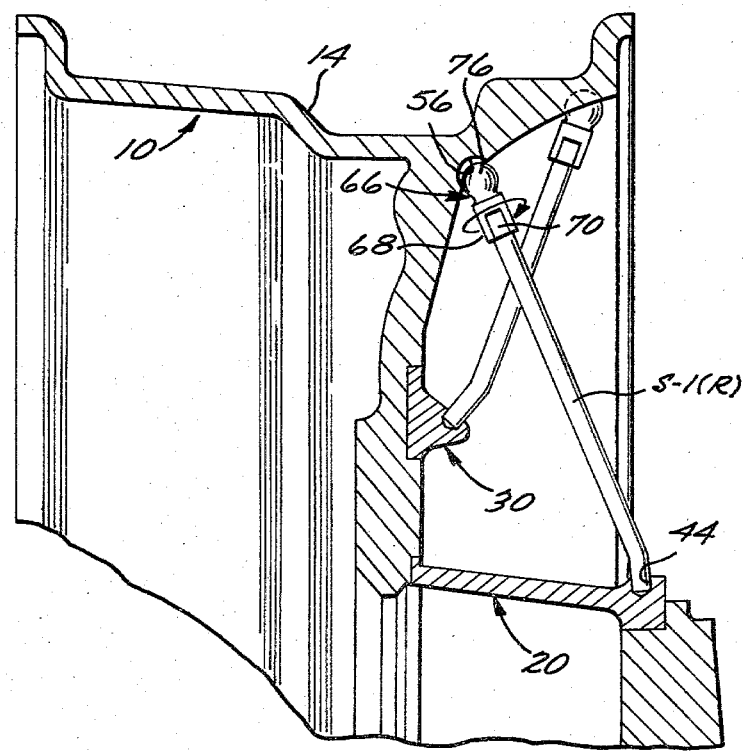

WIRE SPOKE WHEEL

BACKGROUND OF THE INVENTION

Authentic automobile wire spoke wheels, while attractive, are subject to several disadvantages not inherent to conventional solid wheels. Primarily, wire spoke wheels are both expensive to manufacture and troublesome to maintain. Such wheels have traditionally been formed of chrome-plated steel. Because of the shape of modern automobile wheels, it is difficult, if not impossible to uniformly chrome-plate the rim portion of the wheel. Another disadvantage inherent to most conventional authentic automobile wire spoke wheels, is that the spokes that protrude through the tire rim into the tire area. Accordingly, it is necessary to either attempt to seal the aperture in the tire rim through which the outer end of the spokes protrude, or alternatively, a tube-type tire must be utilized. Tube-type tires, however, are not presently popular. Yet another disadvantage of authentic automobile wire spoke wheels is that when such wheel engages a road hazard, curb, or other solid object, the spokes must often be adjusted and retuned. This procedure requires special equipment and the services of a skilled mechanic. It is likewise well known, that authentic automobile wire spoke wheels utilize a hub and a rim connected by the wire spokes with the opening between the hub and the rim permitting grease, oil and road dirt to coat the spokes. Such spokes are difficult to clean, except by steam cleaning.

SUMMARY OF THE INVENTION

It is a major object of the present invention to provide a vehicle wheel combining the advantages of a conventional solid wheel body with the appearance of an authentic wire spoke wheel.

Another object of the present invention is to provide a vehicle wheel of the afore-described nature which is economical to manufacture, rugged of construction and which will aford a long and trouble-free service life.

A more particular object of the present invention is to provide a vehicle wheel of the afore-described nature, which includes a solid wheel body and a hub, with a first row of wire spokes extending between the intermediate portion of the wheel body and the radially outer portion thereof, and a second row of spokes extending from the outer portion of the hub to the intermediate portion of the solid wheel body. Such first and second rows of spokes are readily replaceable by means of longitudinally moveable mounting members secured to one end of each of such spokes, these mounting members being longintudinally extendable relative to their respective spokes, so as to thereby place such spokes in longitudinal compression and wedging such spokes in place upon the wheel.

An additional object of the present invention is to provide a vehicle wheel of the afore-described nature wherein the number and pattern of these spokes may take various forms so as to permit the aesthetic design of the wheel to be varied in accordance with the desires of different designers.

Other objects and advantages of the present invention will become apparent from the following detailed description taken in conjunction with the accompanying drawings.

BRIEF DESCRIPTION OF THE DRAWINGS

FIG. 6 is a sectional view taken in enlarged scale along 6—6 of FIG. 5;

FIG. 7 is a fragmentary cross-sectional view similar to FIG. 2 showing how a damaged spoke may be removed from the wheel body;

FIG. 8 is a view similar to FIG. 6 showing the installation of a new spoke replacing the damaged spoke.

DESCRIPTION OF THE PREFERRED EMBODIMENT

Figure 1:
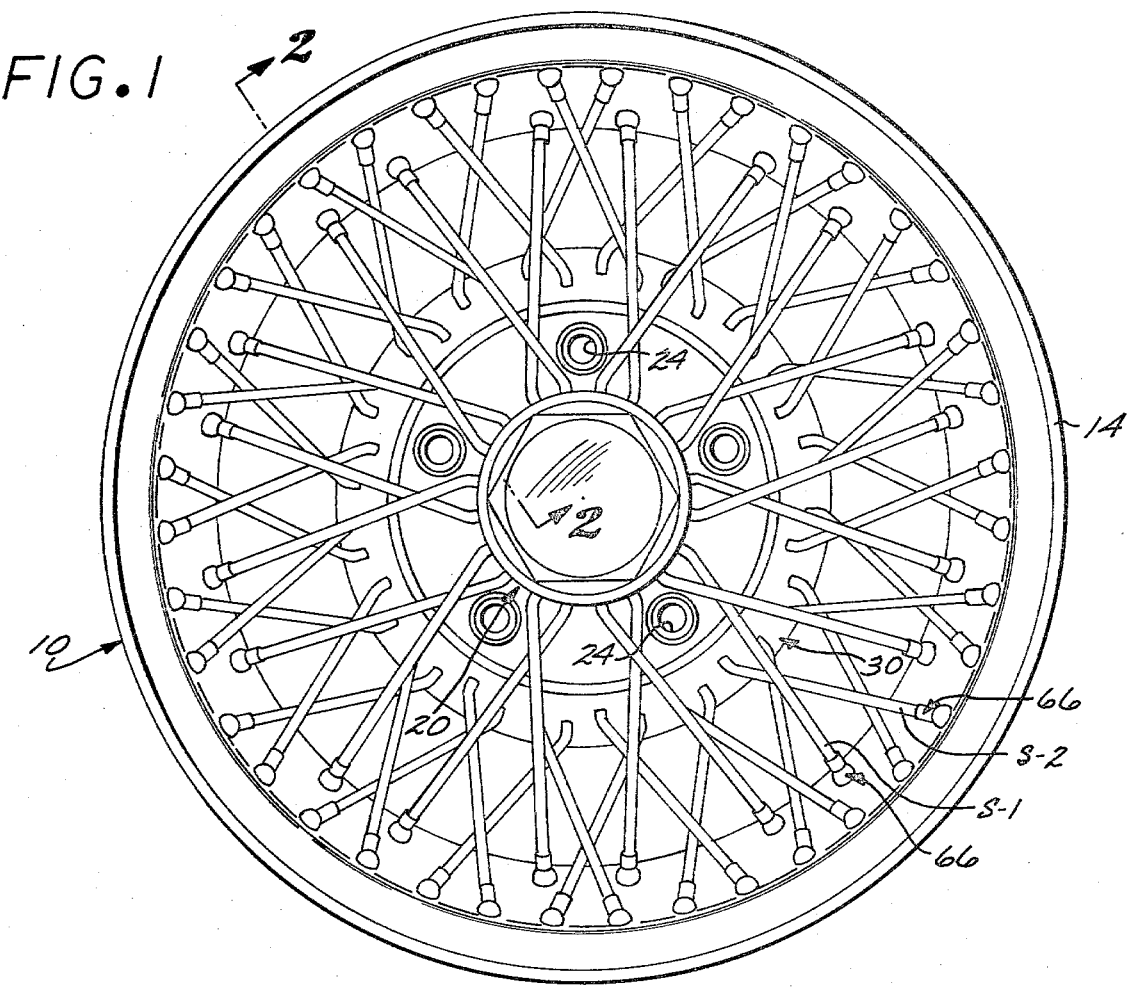
FIG. 1 is a side elevational view showing the exterior of a preferred form of vehicle wheel embodying the present invention.

Referring to the drawings, there is shown in FIGS. 1-8 a preferred form of wire spoke vehicle wheel embodying the present invention. The wheel includes a solid body generally designated 10, having a radially extending bolt-on flange 12 formed at its radially outer portion with a conventional multi-flange drop center tire rim 14. The bolt-on flange 12 is secured upon the vehicle's brake drum (not shown), in a conventional manner. A hub, generally bolt-on flange 12. The radially outer portion of the designated 20, is attached to bolt-on flange 12 extends radially outwardly and exteriorally away from the center portion of such bolt-on flange. Preferably, the wheel body 10 is of integral cast aluminum construction, thereby afording maximum strength combined with a minimum cost of manufacture and minimum weight. A spoke ring, generally designated 30, is coaxially affixed to the wheel body 10 radially outwardly, of lug bolt bores 24.

Hub 20 is of generally truncated frusto-conical configuration having a lip 32 at its rear end secured within an annular groove 36 formed in the front of bolt-on flange 12. The front end of hub 32 is of reduced diameter and is formed with a collar 38 that telescopically receives a conventional hub cap 40. The radially outer portion of collar 38 is formed with a flat surface 42 that slants radially inwardly from its front end. A first plurality of circumferentially spaced recesses 44 extend radially inwardly from collar surface 42.

Spoke ring 30 includes a base portion 46 which is rigidly secured within a circumferential groove 48 formed in the intermediate portion of bolt-on flange 12. Forwardly of body 10, spoke ring 30 is of generally triangular configuration having a flat surface 50 that slants radially inwardly and forwardly relative to bolt-on flange 12. A second plurality of circumferentially spaced like recesses 54, extend radially inwardly and rearwardly from surface 50, as shown particularly in FIG. 2. Recesses 44 and 54 face generally radially outwardly.

Figure 2:
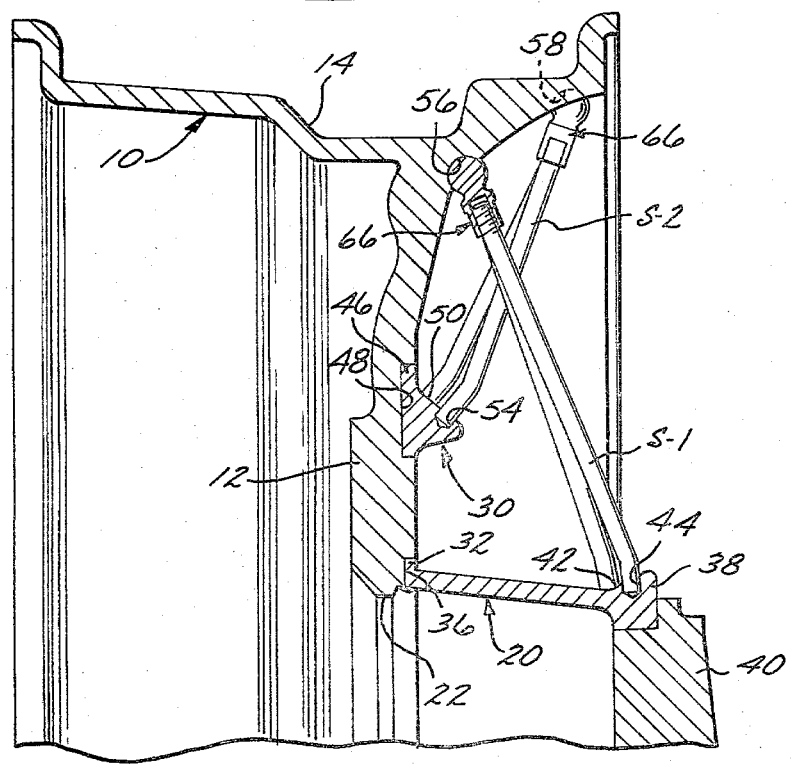
FIG. 2 is a sectional view taken in enlarged scale along line 2—2 of FIG. 1.
Figure 3:
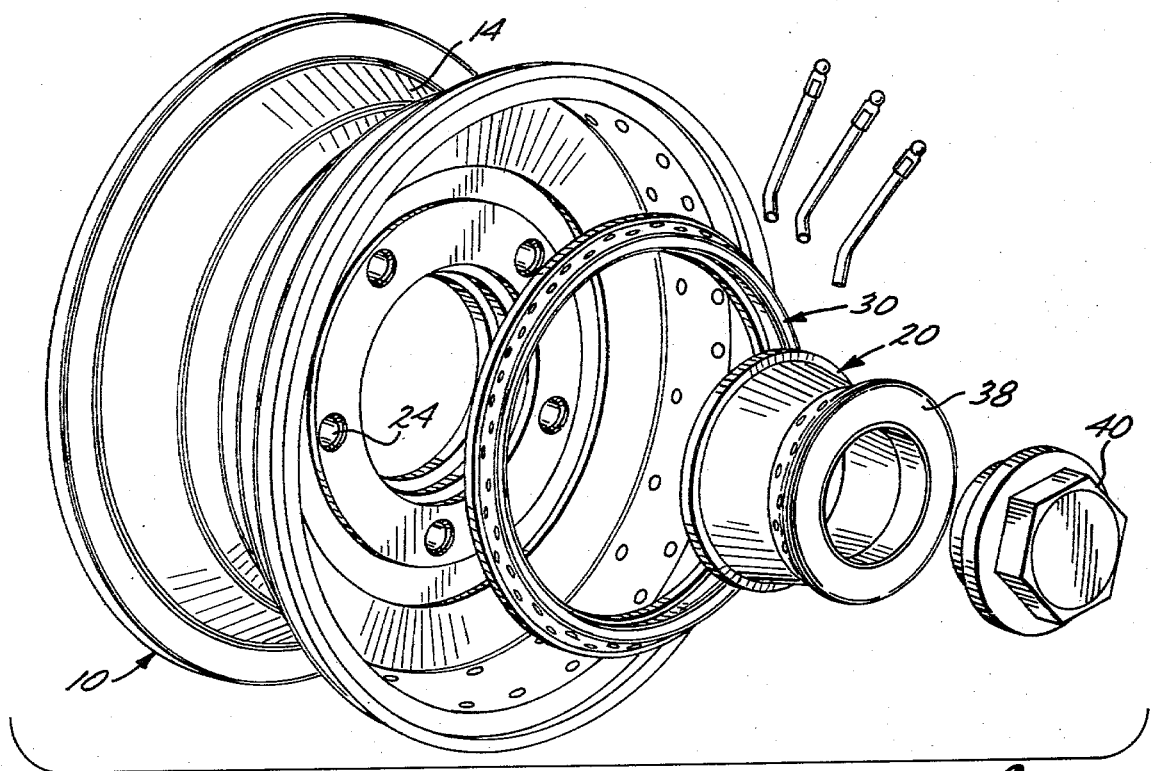
FIG. 3 is a horizontally exploded perspective view of said vehicle wheel; p
Figure 4:
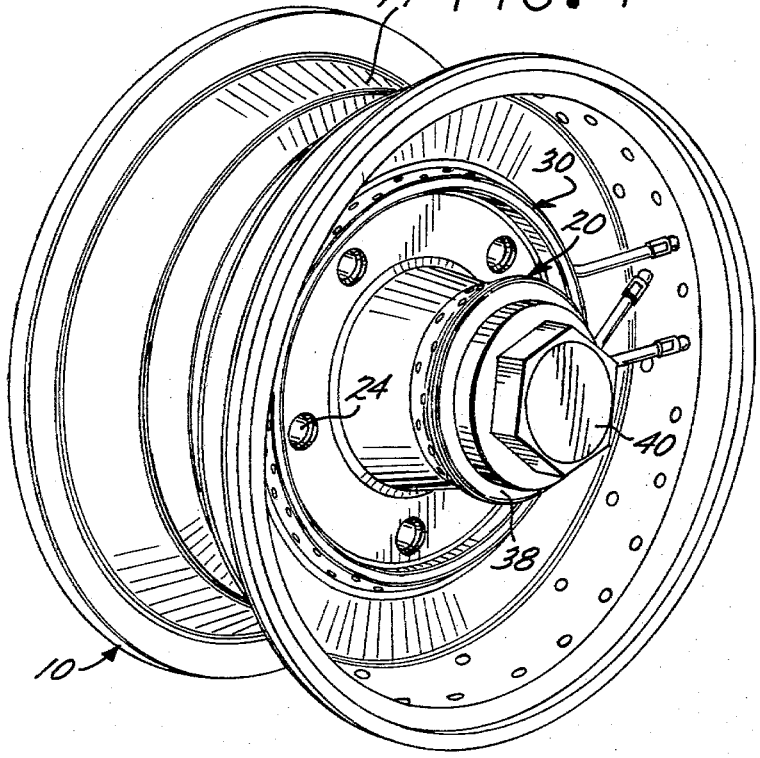
FIG. 4 is a perspective view showing the parts of FIG. 3 in an assembled condition.
Figure 5:
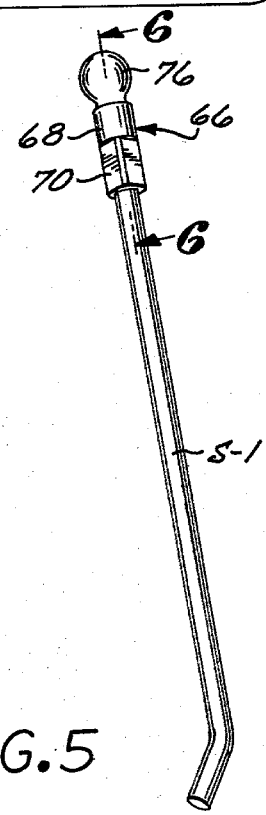
FIG. 5 is a perspective view of a spoke member of said vehicle wheel.

With continued reference to FIG. 2, the wheel body 10 is formed adjacent the intermediate front underside of the drop center tire rim 14 with a first plurality of like spherical, circumferentially spaced sockets 56. A second set of like spherical sockets 58 are circumferentially spaced about the radially outer front portion of the drop center tire rim 14, radially outwardly of the first set of sockets 56. Sockets 56 and 58 face generally radially inwardly. A first set of spokes S-1 extend between the recesses 44 of hub 20 and the first spherical sockets 56. A second set of shorter spokes S-2 extend between the recesses 54 of spoke ring 30 and the radially outer second set of sockets 58 formed in drop center tire rim 14. As shown in FIG. 2, sockets 56 and 58 do not extend through rim 14.

The radially outer ends of the spokes are provided with mounting members, generally designated 66, of like construction. As shown particularly in FIG. 6, such mounting members include a generally cylindrical boss 68, the radially inner end of which is formed with flats 70 to receive a rotation imparting tool, such as a wrench. Each boss 68 is formed with an internally threaded bore 72 which is threadably engaged with complimentary threads 74, formed on the radially outer end of its respective spoke. The radially outer end of each boss 68 includes with an integral ball 76, such balls being rotatably being seated within the afore-described sockets 56 and 58. It will be apparent that rotation of the mounting members 66 upon their respective spokes will cause such mounting members to undergo longitudinal movement relative to their respective spokes.

The manner whereby the spokes S-1 and S-2 are removeably installed on wheel body 10 is illustrated in FIGS. 7 and 8. Thus referring to FIG. 8, there is shown a wheel body 10 of the afore-described construction. One of the longer spokes S-1 of such wheel is shown as being damaged. Under these circumstances, it is desireable to replace the damaged spoke with a replacement. Such removal is readily effected by rotating the mounting member 66 thereof relative to the end of the spoke S-1 whereupon it is mounted so as to retract the mounting member along the length of the spoke. Such retraction will withdraw the ball 76 of the mounting member from within its complimentary socket 56, thereby shortening the effective length of the spoke S-1. Such spoke may then be withdrawn from its complimentary recess 54 as shown in phantom outline in FIG. 7.

Referring now to FIG. 8, a replacement spoke S-1(R) is shown being installed in wheel body 10. Such installation is effected by first inserting the radially inner end of the replacement spoke within its complimentary recess 54. Thereafter, the spokes mounting member 66 is rotated upon such spoke so as to advance it within the confines of its respective socket 56, i.e. the effective length of the replacement spoke is increased and the spoke itself is placed in compression relative to the wheel. Accordingly, the spoke will be rigidly supported upon the wheel in a rattle-free condition. It will be apparent that the shorter spokes S-2 can be installed within and removed from their respective recesses and sockets in the same manner described hereinbefore, with respects to the longer spokes S-1. The spokes are solely ornamental in function and do not lend any appreciable strength to the wheel. It should be observed that the spacing and positioning of the recesses and sockets as well as the configuration of the spokes may be widely varied so as to permit wide leeway to automobile stylists. It should further be noted that since the spokes are sealed with respect to the brake drum and other interior wheel supporting components by the solid bolt on flange 12, hub 20 and hub-cap 40, such spokes will not be exposed to grease or other foreign matter. Finally, it should be noted that the exteriorly facing portion of wheel body 10 may be brightly polished so as to provide an aesthetically pleasing appearance. Furthermore, if desired, a colored insert, for example an insert keyed to the color of the automobile may overlie all or a portion of the exteriorally facing wheel body 10 to further enhance the aesthetic appearance of the completed wheel.

Figure 9:
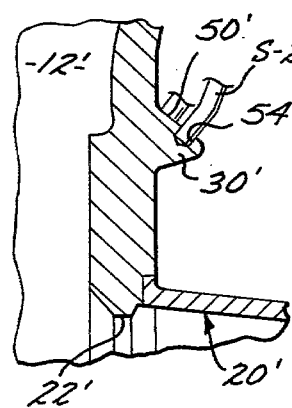
FIG. 9 is a fragmentary cross-sectional view showing a modified form of spoke ring.

Referring now to FIG. 9 there is shown a modified type of vehicle wheel body 10' wherein like parts bear double primed reference numerals. Thus, instead of being provided with the afore-described separate spoke ring 30, wheel body 10' is formed with an integral spoke ring 30' having a flat surface 50' that slants radially inwardly and forwardly relative to bolt-on flange 12'. Recesses 54' corresponding to recesses 54 of wheel body 10, extend radially inwardly and rearwardly from surface 50', such recesses facing generally radially outwardly to receive the radially inner ends of spokes S-2'. In all other respects, wheel body 10' is similar to wheel body 10 described hereinbefore.

Figure 10:
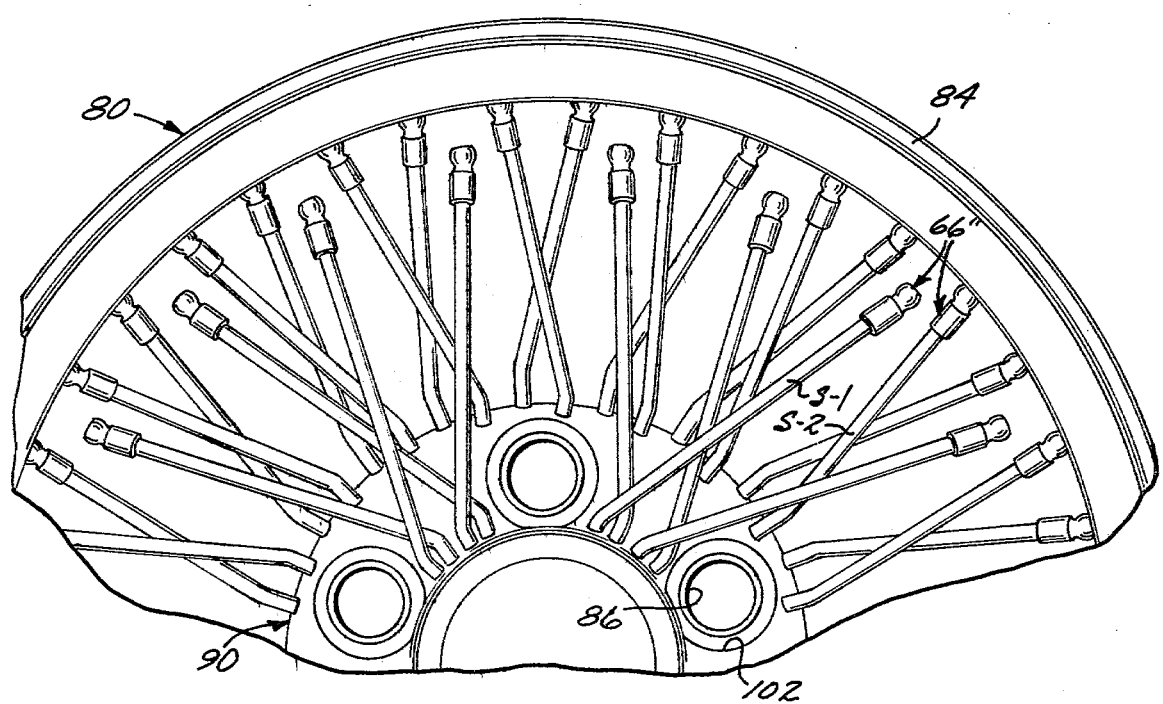
FIG. 10 is a broken side elevational view showing another form of vehicle wheel embodying the present invention.
Figure 11:
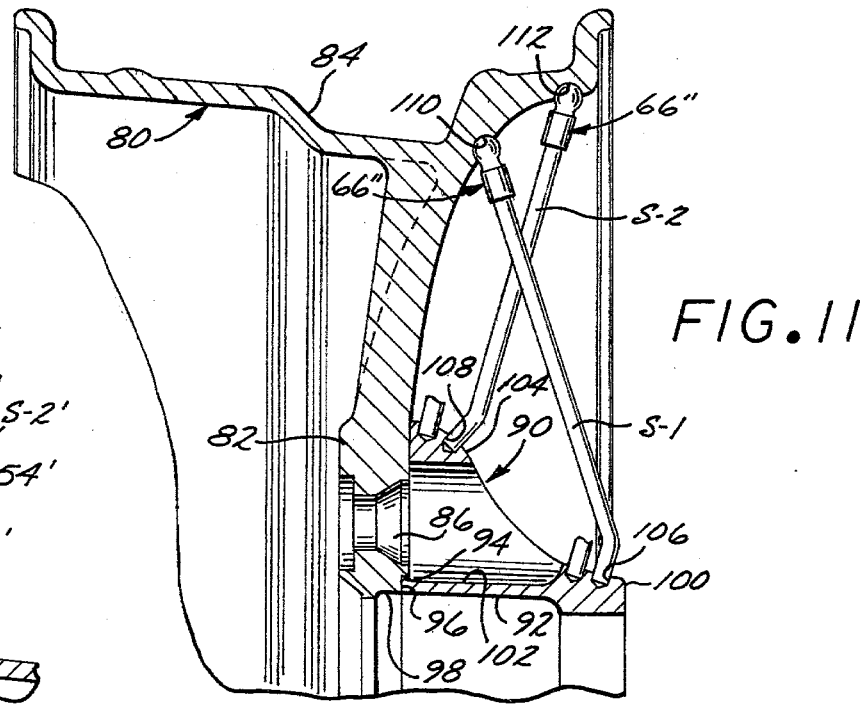
FIG. 11 is a sectional view taken along line 11—11 of FIG. 10.

Referring now to FIGS. 10 and 11, there is shown another form of vehicle wheel embodying the present invention. This form of wheel includes a solid body generally designated 80 having a radially extending bolt-on flange 82 formed at its radially outer portion with a conventional multi-flange drop center tire rim 84. A plurality of circumferentially spaced bores 86 are formed in the bolt-on flange 82 to receive conventional lug bolts and nuts (not shown). Wheel body 80 is provided with a separate tower generally designated 90 of generally frusto-conical configuration which receives the radially inner ends of both sets of spokes S-1 and S-2. It will be understood that such spokes are substantially identical in construction to those described hereinbefore.

More particularly, tower 90 is formed with a coaxial bore 92, coaxially aligned with central aperture 94 of wheel body 80. The rear portion of tower 90 is rigidly secured in a conventional manner within a circumferential groove 96 formed in the front of bolt-on flange 82 adjacent the latters central aperture 94. The front portion of tower 92 is formed with a collar 100. The intermediate portion of tower 90 is formed with a plurality of circumferentially spaced openings 102 aligned with bores 24 to permit access to the lug bolts and nuts. The radially outer portion of tower 90 defines a spoke ring 104. A first and second plurality of circumferentially spaced recesses 106 extend generally radially inwardly from collar 100. A first and second plurality of circumferentially spaced recesses 108 similarly extend generally radially inwardly and rearwardly from spoke ring 30'. These recesses receive the radially inner end of spokes S-1 "and S-2". The radially outer ends of such spokes are provided with the aforedescribed mounting members 66". These spoke mounting members are received in inner and outer spherical sockets 110 and 112, respectively, similar to sockets 56 and 58 described hereinbefore formed in wheel body 80 as shown clearly in FIG. 11. Spokes S-1" and S-2" are mounting on the wheel in the same manner as described hereinbefore. From the foregoing description it will be observed that tower 90 serves both as a wheel hub and as a spoke ring thereby reducing the number of parts and the machining required in the construction of the vehicle wheel embodying the present invention.

Various modifications and changes may be made with respect to the foregoing detailed description without departing from the spirit of the present invention.

I claim:

1. A vehicle wheel, comprising:
   a solid wheel body having a radially extending bolt-on flange that merges into a tire-receiving rim;
   a cylindrical hub coaxially secured to the radially inner portion of said bolt-on flange and extending axially forwardly away from said flange;
   a coaxial spoke ring on the exterior of the intermediate portion of said bolt-on flange;
   a plurality of first recesses spaced circumferentially around the periphery of the front portion of said hub, and facing generally radially outwardly;
   a plurality of second recesses spaced circumferentially around the periphery of said spoke ring and facing generally radially outwardly;
   a plurality of first sockets spaced circumferentially around the periphery of the intermediate portion of said wheel body and facing generally radially inwardly;
   a plurality of second sockets spaced circumferentially around the periphery of said wheel body radially outwardly and forwardly of said first sockets, said second sockets facing generally radially inwardly;
   a first plurality of removable ornamental spokes, each having their radially inner end disposed within one of said first recesses, and said spokes having threads formed on their radially outer end;
   a second plurality of removable ornamental spokes, each having their radially inner end disposed within one of said second recesses, and said spokes having threads formed on their radially outer end; and
   a spoke mounting member threadably carried upon the threaded end of each of said spokes for axial movement relative to the longitudinal axis of said spokes, each said mounting member carried by said first spokes having a ball that is rotatably disposed within one of said first sockets, and each said mounting member carried by said second spokes being rotatably disposed within one of said second sockets, with said spokes being releasably retained in place upon said wheel by rotating said mounting members upon said spoke members to thereby vary the effective length of such spokes and place such spokes and their mounting members in longitudinal compression.

2. A vehicle wheel as set forth in claim 1, wherein said second spokes are shorter than said first spokes.

3. A vehicle wheel as set forth in claim 2, wherein each said mounting member includes a boss formed with tool-receiving flats and said boss is also formed with an internally threaded bore threadably engaged with the threads of its respective spoke.

4. A vehicle wheel as set forth in claim 1, wherein each said mounting member includes a boss formed with tool-receiving flats and said boss is also formed with an internally threaded bore threadably engaged with the threads of its respective spoke.

5. A vehicle wheel, comprising:
   a solid wheel body having a radially extending bolt-on flange that merges into a tire-receiving rim;
   a generally frusto-conical tower coaxially secured to the radially inner portion of said bolt-on flange and extending axially forwardly away from said flange, said tower having a coaxial spoke ring on its radially outward rear portion and with the radially inner portion of said tower defining a hub;
   a plurality of first recesses spaced circumferentially around the periphery of the front portion of said hub, and facing generally radially outwardly;
   a plurality of second recesses spaced circumferentially around the periphery of said spoke ring and facing generally radially outwardly;
   a plurality of first sockets spaced circumferentially around the periphery of the intermediate portion of said wheel body and facing generally radially inwardly;
   a plurality of second sockets spaced circumferentially around the periphery of said wheel body radially outwardly and forwardly of said first sockets, said second sockets facing generally radially inwardly;
   a first plurality of removable ornamental spokes, each having their radially inner end disposed within one of said first recesses, and said spokes having threads formed on their radially outer end;
   a second plurality of removable ornamental spokes, each having their radially inner end disposed within one of said second recesses, and said spokes having threads formed on their radially outer end; and
   a spoke mounting member threadably carried upon the threaded end of each of said spokes for axial movement relative to the longitudinal axis of said spokes, each said mounting member carried by said first spokes having a ball that is rotatably disposed within one of said first sockets, and each said mounting member carried by said second spokes being rotatably disposed within one of said second sockets, with said spokes being releasably retained in place upon said wheel by rotating said mounting members upon said spoke members to thereby vary the effective length of such spokes and place such spokes and their mounting members in longitudinal compression.

6. A vehicle wheel as set forth in claim 5, wherein said second spokes are shorter than said first spokes.

7. A vehicle wheel as set forth in claim 6, wherein each said mounting member includes a boss formed with tool-receiving flats and said boss is also formed with an internally threaded bore threadably engaged with the threads of its respective spoke.

8. A vehicle wheel as set forth in claim 5, wherein each said mounting member includes a boss formed with tool-receiving flats and said boss is also formed with an internally threaded bore threadably engaged with the threads of its respective spoke.

9. In a vehicle wheel construction having a solid and one-piece integral wheel body that includes a radially extending bolt-on flange which merges into a tire-receiving rim;
   a plurality of replaceable spokes extending between radially inner and outer points on said wheel body, the outer end of each said spoke being threaded;
   a plurality of recesses spaced circumferentially around said wheel body, said recesses each removably receiving the inner end of one of said spokes;
   a plurality of non-apertured cup shaped sockets spaced circumferentially along the peripheral surface of said wheel body axially of and facing toward said recesses; and, a mounting member threadedly carried by the outer end of each of said spokes and including a ball rotatably and removably disposed within one of said sockets, said mounting member also being formed with tool-receiving flats inwardly of said ball for imparting rotation to said mounting member, with said spokes being releasably retained within said sockets by rotating said mounting members upon said spokes to thereby vary the effective length of said spokes and place said spokes and their mounting members in longitudinal compression, said non-apertured cup shaped sockets having said mounting member balls matingly inserted therein.

* * * * *

UNITED STATES PATENT AND TRADEMARK OFFICE
CERTIFICATE OF CORRECTION

PATENT NO. : 4,226,478
DATED : October 7, 1980
INVENTOR(S) : RAYMOND C. BROWN

It is certified that error appears in the above–identified patent and that said Letters Patent are hereby corrected as shown below:

Column 2, line 38, after "hub", insert

--generally designated 20, is attached to--

Signed and Sealed this

Seventeenth Day of February 1981

[SEAL]

Attest:

RENE D. TEGTMEYER

Attesting Officer

Acting Commissioner of Patents and Trademarks